(12) United States Patent
Newman et al.

(10) Patent No.: US 11,644,522 B2
(45) Date of Patent: May 9, 2023

(54) TRIANGULAR BEAM CONFIGURATIONS FOR RAPID BEAM ALIGNMENT IN 5G AND 6G

(71) Applicants: David E. Newman, Poway, CA (US); R. Kemp Massengill, Palos Verdes, CA (US)

(72) Inventors: David E. Newman, Poway, CA (US); R. Kemp Massengill, Palos Verdes, CA (US)

(73) Assignee: Ultralogic 6G, LLC, Palos Verdes, CA (US)

( * ) Notice: Subject to any disclaimer, the term of this patent is extended or adjusted under 35 U.S.C. 154(b) by 0 days.

(21) Appl. No.: 17/888,762

(22) Filed: Aug. 16, 2022

(65) Prior Publication Data

US 2022/0390540 A1 Dec. 8, 2022

Related U.S. Application Data

(60) Provisional application No. 63/395,980, filed on Aug. 8, 2022.

(51) Int. Cl.
| | |
|---|---|
| *H04B 7/06* | (2006.01) |
| *G01S 3/02* | (2006.01) |
| *H04W 16/28* | (2009.01) |
| *H04W 24/08* | (2009.01) |

(52) U.S. Cl.
CPC .............. *G01S 3/02* (2013.01); *H04B 7/0617* (2013.01); *H04W 16/28* (2013.01); *H04W 24/08* (2013.01)

(58) Field of Classification Search
CPC ........... G01S 3/02; G01S 3/06; H04B 7/0617; H04W 16/28; H04W 24/08
See application file for complete search history.

(56) References Cited

U.S. PATENT DOCUMENTS

| | | |
|---|---|---|
| 6,593,880 B2 | 7/2003 | Velazquez |
| 2002/0147032 A1 | 10/2002 | Yoon |
| 2003/0125046 A1 | 7/2003 | Riley |
| 2010/0124212 A1 | 5/2010 | Lo |
| 2011/0238286 A1 | 9/2011 | Roesser |

(Continued)

FOREIGN PATENT DOCUMENTS

WO 2017184190 10/2017

*Primary Examiner* — Kenneth T Lam
(74) *Attorney, Agent, or Firm* — Mayer & Williams, PC

(57) ABSTRACT

In 5G and 6G, beam alignment remains an arduous, time-consuming process. Procedures are disclosed herein for rapid and efficient beam alignment, by configuring a phased-array antenna to emit a "triangular beam", which is a wide beam that varies in angle from a high power at angle-1 to a low power at angle-2, with a ramp-like intensity variation in the region between the two angles. Then a second signal is emitted, with the triangular distribution reversed (higher power at angle-2). A receiver can then measure the as-received amplitudes from the two triangular beams, calculate the ratio of signal reception from the two beams, and thereby determine the alignment angle. In another version, the transmitter transmits two non-directional pulses, and the receiver detects them using a triangular sensitivity distribution versus angle. By either method, the devices can align their beams using just two triangle beam pulses, saving substantial time, resources, and background generation.

20 Claims, 7 Drawing Sheets

(56) References Cited

U.S. PATENT DOCUMENTS

| | | | |
|---|---|---|---|
| 2015/0085761 A1* | 3/2015 | Maltsev | H04B 7/0452 370/329 |
| 2016/0212631 A1* | 7/2016 | Shen | H04W 56/001 |
| 2019/0364390 A1 | 11/2019 | Kurras | |
| 2020/0112360 A1 | 4/2020 | Krunz | |
| 2021/0007173 A1 | 1/2021 | Su | |
| 2021/0203398 A1 | 7/2021 | Kapetanovic | |
| 2021/0273714 A1 | 9/2021 | Lee | |
| 2021/0306870 A1 | 9/2021 | Lee | |
| 2021/0328691 A1 | 10/2021 | Palally | |
| 2021/0336686 A1 | 10/2021 | Rune | |
| 2021/0351835 A1 | 11/2021 | Woo | |
| 2021/0353787 A1* | 11/2021 | Palti | A61L 2/24 |
| 2022/0006505 A1 | 1/2022 | Ryu | |
| 2022/0018925 A1* | 1/2022 | Duan | G01S 5/08 |
| 2022/0091221 A1 | 3/2022 | Manolakos | |
| 2022/0167342 A1 | 5/2022 | Raghavan | |

* cited by examiner

TRIANGULAR BEAM CONFIGURATIONS FOR RAPID BEAM ALIGNMENT IN 5G AND 6G

PRIORITY CLAIMS AND RELATED APPLICATIONS

This application claims the benefit of US Provisional Patent Application Ser. No. 63/395,980, entitled "Triangular Beam Configurations for Rapid Beam Alignment in 5G and 6G", filed Aug. 8, 2022, all of which are hereby incorporated by reference in their entireties.

FIELD OF THE INVENTION

The disclosure pertains to wireless beamforming, and more particularly to means for selecting an optimum beam direction.

BACKGROUND OF THE INVENTION

In 5G and 6G, many communications are carried out using "beams" or directed radiation, aimed at the intended recipient. However, a complex time-consuming procedure is required to align the beams in the right directions. What is needed is a simpler, more efficient procedure for determining an optimal beam direction for each recipient.

This Background is provided to introduce a brief context for the Summary and Detailed Description that follow. This Background is not intended to be an aid in determining the scope of the claimed subject matter nor be viewed as limiting the claimed subject matter to implementations that solve any or all of the disadvantages or problems presented above.

SUMMARY OF THE INVENTION

In a first aspect, there is a first wireless entity, configured to: transmit a first triangular beam comprising electromagnetic energy transmitted in a range of directions between a first angle and a second angle, wherein the electromagnetic energy has a first intensity at the first angle and a second intensity at the second angle, wherein the second intensity is lower than the first intensity, and wherein the intensity varies monotonically from the first intensity at the first angle to the second intensity at the second angle; and transmit a second triangular beam comprising electromagnetic energy transmitted in the range of directions between the first angle and the second angle, wherein the electromagnetic energy has the second intensity at the first angle and the first intensity at the second angle, and wherein the intensity varies monotonically from the second intensity at the first angle to the first intensity at the second angle.

In another aspect, there is a method for a wireless receiver to determine an angle, the method comprising: preparing a first triangular reception beam comprising an angular distribution of signal receptivity, wherein the signal receptivity varies in a range of angles between a first angle and a second angle, wherein the receptivity at the first angle is a first value and the receptivity at the second angle is a second value, the second value lower than the first value, and wherein the receptivity varies monotonically between the first value at the first angle and the second value at the second angle; receiving a first transmission using the first triangular reception beam, and determining a first amplitude of the first signal; preparing a second triangular reception beam comprising an angular distribution of signal receptivity, wherein the signal receptivity varies in the range of angles between the first angle and the second angle, wherein the receptivity at the first angle is the second value and the receptivity at the second angle is the first value, and wherein the receptivity varies monotonically between the second value at the first angle and the first value at the second angle; receiving a second transmission using the second triangular reception beam, and determining a second amplitude of the second signal; and determining an alignment angle according to the first and second amplitudes and the first and second angles.

In another aspect, there is non-transitory computer-readable media in a base station of a wireless network, the media containing instructions that when implemented in a computing environment cause a method to be performed, the method comprising: determining that beam alignment is needed; configuring an antenna to emit electromagnetic radiation according to a first angular distribution comprising an intensity that increases monotonically from a first value at a first angle to a second value at a second angle, and transmitting a first pulse according to the first angular distribution; configuring the antenna to emit further electromagnetic radiation according to a second angular distribution comprising an intensity that decreases linearly from the second value at the first angle to the first value at the second angle, and transmitting a second pulse according to the second angular distribution; receiving, from a user device of the wireless network, a data message specifying either a first measurement and a second measurement, or a ratio of the first and second measurements; determining, according to the first and second measurements, or the ratio, and according to the first and second angles, an alignment direction toward the user device; and transmitting an alignment message to the user device, specifying either an alignment angle representing the alignment direction, or the alignment angle plus 180 degrees.

This Summary is provided to introduce a selection of concepts in a simplified form. The concepts are further described in the Detailed Description section. Elements or steps other than those described in this Summary are possible, and no element or step is necessarily required. This Summary is not intended to identify key features or essential features of the claimed subject matter, nor is it intended for use as an aid in determining the scope of the claimed subject matter. The claimed subject matter is not limited to implementations that solve any or all disadvantages noted in any part of this disclosure.

These and other embodiments are described in further detail with reference to the figures and accompanying detailed description as provided below.

BRIEF DESCRIPTION OF THE DRAWINGS

Like reference numerals refer to like elements throughout.

DETAILED DESCRIPTION

Figure 1A:
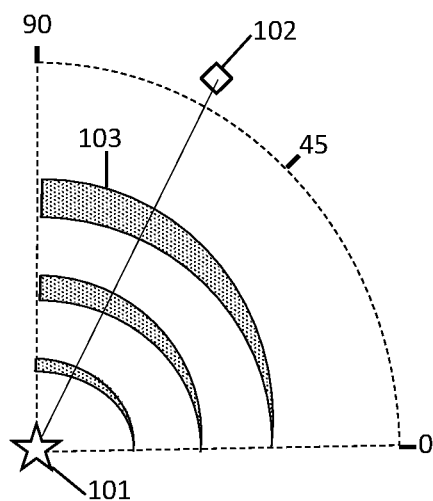
FIG. 1A is a schematic showing an exemplary embodiment of a triangular transmission beam, according to some embodiments.

Systems and methods disclosed herein (the "systems" and "methods", also occasionally termed "embodiments" or "arrangements" or "versions", generally according to present principles) can provide urgently needed wireless communication protocols for aligning directional transmission beams and reception beams to improve communication quality. Instead of wasting time and resources on prior-art multi-step beam alignment procedures, the procedures disclosed herein can enable a transmitter and a receiver to rapidly select the best beam direction using a "triangular" beam procedure. A triangular beam, as used herein, is a beam configured to have a high signal at a first angle, and a low signal at a second angle, with the signal decreasing ("tapering") in a ramp-like monotonic fashion between the two angles; hence, the signal distribution versus angle is triangular in shape. The signal may be configured to vary in a linear fashion, or an approximately linear fashion, or other monotonically increasing or decreasing distribution. A correction function may be determined, based on the difference between the actual angular distribution and a linear distribution, and the measurements may be corrected according to the correction function.

In a first version (the "triangular transmission beam" version), an antenna with beamforming capability may be energized and phased to transmit a first signal pulse having a high signal level at a first angle and a low signal level at a second angle, and with a monotonically decreasing signal level at each angle between the first and second angles. The transmitter can transmit a second pulse with a reversed beam shape, having the low signal at the first angle and the high signal at the second angle. A receiver, at some unknown angle, can measure the received signal levels for the two pulses. The receiver can then calculate a ratio of the two received signal levels, and (if it knows the first and second angles) can determine the "alignment" angle, corresponding to the direction from the receiver toward the transmitter. If the receiver does not know the first and second angles, or the shape of the angular distribution, the receiver can transmit a reply message to the transmitter indicating the two signal levels as-received, and the transmitter can calculate the alignment angle and send a "results" message to the receiver, indicating the alignment angle. Thus the transmitter and the receiver can align their beams toward each other, using just two brief pulses. Compared to the prior-art iterative alignment procedure, the disclosed procedure is faster, consumes less energy, occupies less resources, and can provide a more precise alignment.

In a second version (the "triangular reception beam" version), the transmitter can transmit two ordinary non-directional signal pulses in two resource elements. These are ordinary isotropic transmissions, not directed beams and not triangular beams. The receiver, on the other hand, receives the pulses using a triangular sensitivity distribution. The receiver first configures its reception antenna to have a triangular or ramp-shaped angular distribution of monotonically increasing or decreasing sensitivity versus angle, between first and second angles, which is termed a triangular reception beam. For example, the sensitivity may be highest at the first angle and lowest at the second angle, with a monotonically tapering sensitivity between the first and second angles. Using the triangular reception beam, the user device can measure the as-received signal level during the first non-directional pulse. Then the receiver can reconfigure its antenna for a triangular reception beam tapered in the opposite direction, with the lowest sensitivity at the first direction and the highest sensitivity at the second direction. The receiver can then measure the received signal in the second non-directional pulse using the second triangular reception beam. The receiver can calculate a ratio of the first and second received signals, and based on the first and second angles, the receiver can calculate the alignment angle toward the transmitter. Optionally, the receiver can transmit an alignment message to the transmitter, using a narrow (not triangular) transmission beam focused and directed in the alignment direction, acknowledging the result and informing the transmitter of the alignment direction so determined.

Many potential errors are canceled in the ratio of the measurements. Since the two ramp directions are opposite, the procedure causes many static parameters to cancel, and can thereby yield a precise result for the alignment angle over most of the ramp region between the first and second angles. For example, the ratio is independent of the overall energy scale, the overall sensitivity of the receiver, the absolute power density of the transmitted beam, and many others. The ratio of the two signal measurements thereby enables a direct determination of the alignment angle from the measured data. Moreover, the continuous nature of the triangular distribution enables a high-accuracy determination of the alignment angle in the ramp region, using just a single pair of brief pulses. In contrast, the prior-art iterative scan procedure requires a large number of narrow test beams in different directions, with multiple feedback messages from the receiver. In this way, and others, the disclosed triangular beam alignment procedures are resource-efficient, low-power, low-complexity, high-precision, and fast.

Reciprocity is assumed throughout, in the sense that the same alignment angle or alignment direction is assumed to be optimal for both reception and transmission purposes. The alignment directions of the two entities are generally about 180 degrees opposite. However, for simplicity herein, both entity alignment angles will be termed "the alignment angle" or "the alignment direction", unless explicitly measured by the two entities. "Directions", and the "angles" representing the directions, are used interchangeably herein. The directions, and the corresponding angles, may be relative to a common coordinate system such as geographic north. "Signals" may represent amplitudes, power levels, power density, or other measure of transmitted or received electromagnetic beam intensity in different implementations. A "beam", as used here and in most references, refers to a distribution function versus angle (such as an emitted power distribution or a receiver sensitivity distribution), and also to the electromagnetic radiation which is emitted or received according to that distribution function.

The amplitude measurements are typically very fast. Each triangle beam can be transmitted in a single resource element and the receiver can generally measure the amplitude to sufficient precision in that resource element. However, if additional information is needed, or for redundant signal measurements to mitigate noise, the transmission can occupy multiple resource elements.

The alignment process can be triggered by many events. For example, one of the entities can transmit a planning message to the other entity. The planning message may specify, for example, the first and second angles, the specific symbol-times for transmission of the first and second pulses, whether the procedure is to use triangular transmission beams or triangular reception beams, which entity is to be the transmitter and which the receiver, and/or whether the triangular beams are to be tapered linearly in amplitude or power density, or some other distribution and some other measure of signal strength.

The alignment procedure can alternatively be triggered by a clock, such as when the procedure is scheduled semi-statically. A system information message or RRC or convention may specify the timing and parameters. For example, the alignment procedure may be scheduled for the first subcarrier of the first and second symbol-times of each frame, and thus may be available for automatic re-alignment by users without unnecessary handshaking.

As a further option, the alignment procedure can be triggered whenever a new user device joins the network. For example, the triangle beam transmissions could be added to one of the random access procedure messages, or appended to the random access procedure, or applied at a later time to assist the new user.

As a yet further option, the triangle beam alignment procedure can be triggered by a mobile user device. For example, the mobile user device can request alignment service whenever the mobile user device changes location. Since the triangle beam alignment procedure occupies just two resource elements, it can be applied as often as desired, with insignificant impact on network operations.

After both entities have aligned their transmission and reception beams toward the other entity, they can exchange acknowledgement messages to each other using narrow focused (not triangular) transmission and reception beams aimed at the calculated alignment direction. The acknowledgement messages may include additional information, such as signal quality information and/or power adjustment suggestions.

In one embodiment, the procedure is performed once (that is, two triangle beam transmissions with opposite slopes), and whichever entity calculates the alignment angle can transmit an alignment message to the other entity, indicating the alignment angle. In other embodiments, the alignment procedure can be performed twice, once for each of the two participating entities. Determining the alignment angle from the perspective of each entity separately may thereby avoid assuming that the same alignment angle is optimal for both entities. In either case, both devices can align their transmission and reception beams toward the other entity with consumption of just a few resource elements.

In a wireless network with multiple user devices, the base station can transmit triangular beam pulses that span an angular range of 0-360 degrees, so that all of the user devices in the network can simultaneously determine their own alignment angle using the same two triangle beam transmissions. For example, a base station can transmit two triangular transmission beams with oppositely-sloped ramps. Multiple user devices can receive and measure the triangular beams at the same time. Each user device can calculate its alignment angle, and then can transmit an alignment message to the base station indicating the alignment angle of that user device. Alternatively, the user devices can transmit the raw amplitude measurements to the base station, and the base station can calculate the alignment angle toward each user device, and can send the results back to each user device. Using the disclosed triangular pulses, the base station and all of the user devices in a network can, simultaneously, determine their alignment angles, using just two pulses in two resource elements, regardless of the total number of user devices. The triangular beam procedure therefore qualifies as an extremely resource-efficient procedure.

By aligning the transmission and reception beams using the disclosed procedures, user devices and networks can rapidly and efficiently gain improved communications with less energy consumption (which may be especially important to battery-powered devices), less background radiation and interference (due to the lower transmission power levels and the reduced angular space exposed), and thereby improved network performance generally, according to some embodiments.

Terms herein generally follow 3GPP (third generation partnership project) standards, but with clarification where needed to resolve ambiguities. As used herein, "5G" represents fifth-generation, and "6G" sixth-generation, wireless technology in which a network (or cell or LAN Local Area Network or RAN Radio Access Network or the like) may include a base station (or gNB or generation-node-B or eNB or evolution-node-B or AP Access Point) in signal communication with a plurality of user devices (or UE or User Equipment or user nodes or terminals or wireless transmit-receive units) and operationally connected to a core network (CN) which handles non-radio tasks, such as administration, and is usually connected to a larger network such as the Internet. The time-frequency space is generally configured as a "resource grid" including a number of "resource elements", each resource element being a specific unit of time termed a "symbol period" or "symbol-time", and a specific frequency and bandwidth termed a "subcarrier" (or "sub-channel" in some references). Symbol periods may be termed "OFDM symbols" (Orthogonal Frequency-Division Multiplexing) in references. The time domain may be divided into ten-millisecond frames, one-millisecond subframes, and some number of slots, each slot including 14 symbol periods. The number of slots per subframe ranges from 1 to 8 depending on the "numerology" selected. The frequency axis is divided into "resource blocks" (also termed "resource element groups" or "REG" or "channels" in references) including 12 subcarriers, each subcarrier at a slightly different frequency. The "numerology" of a resource grid corresponds to the subcarrier spacing in the frequency domain. Subcarrier spacings of 15, 30, 60, 120, and 240 kHz are defined in various numerologies. Each subcarrier can be independently modulated to convey message information. Thus a resource element, spanning a single symbol period in time and a single subcarrier in frequency, is the smallest unit of a message. "Classical" amplitude-phase modulation refers to message elements modulated in both amplitude and phase, whereas "PAM" (pulse-amplitude modulation) refers to separately amplitude-modulating two signals and then adding them with a 90-degree phase shift. The two signals may be called the "I" and "Q" branch signals (for In-phase and Quadrature-phase) or "real and imaginary" among others. Standard modulation schemes in 5G and 6G include BPSK (binary phase-shift keying), QPSK (quad phase-shift keying), 16QAM (quadrature amplitude modulation with 16 modulation states), 64QAM, 256QAM and higher orders. Most of the examples below relate to QPSK or 16QAM, with straightforward extension to the other levels of modulation. QPSK is phase modulated but not amplitude modulated. 16QAM may be modulated according to PAM which exhibits two phase levels at zero and 90 degrees (or in practice, for carrier suppression, ±45 degrees) and four amplitude levels including two positive and two negative amplitude levels, thus forming 16 distinct modulation states. For comparison, classical amplitude-phase modulation in 16QAM includes four positive amplitude levels and four phases of the raw signal, which are multiplexed to produce the 16 states of the modulation scheme. Communication in 5G and 6G generally takes place on abstract message "channels" (not to be confused with frequency channels) representing different types of messages, embodied as a PDCCH and PUCCH (physical downlink and uplink control channels) for transmitting control information, PDSCH and PUSCH (physical downlink and uplink shared channels) for transmitting data and other non-control information, PBCH (physical broadcast channel) for transmitting information to multiple user devices, among other channels that may be in use. In addition, one or more random access channels may include multiple random access channels in a single cell. "CRC" (cyclic redundancy code) is an error-checking code. "RNTI" (radio network temporary identity) is a network-assigned user code. "SNR" (signal-to-noise ratio) and "SINR" (signal-to-interference-and-noise ratio) are used interchangeably unless specifically indicated. "RRC" (radio resource control) is a control-type message from a base station to a user device. "Digitization" refers to repeatedly measuring a waveform using, for example, a fast ADC (analog-to-digital converter) or the like. An "RF mixer" is a device for multiplying an incoming signal with a local oscillator signal, thereby selecting one component of the incoming signal.

In addition to the 3GPP terms, the following terms are defined herein. As mentioned, a "triangular" beam, as used herein, refers to a transmission or reception beam configured to be higher intensity at a first angle than at a second angle, and tapering monotonically between the two angles (as in a linear ramp, for example). Although in references a modulated resource element of a message may be referred to as a "symbol", this may be confused with the same term for a time interval ("symbol-time"), among other things. Therefore, each modulated resource element of a message is referred to as a "modulated message resource element", or more simply as a "message element", in examples below. A "demodulation reference" is a set of Nref modulated "reference resource elements" or "reference elements" modulated according to the modulation scheme of the message and configured to exhibit levels of the modulation scheme (as opposed to conveying data). Thus integer Nref is the number of reference resource elements in the demodulation reference. A "calibration set" is one or more amplitude levels or phase levels (or both), which have been determined according to a demodulation reference, representing the predetermined modulation levels of a modulation scheme. Thus the receiver can determine the modulation levels from one or more demodulation reference, calculate intermediate levels by interpolation (if any), and can then record the full set of modulation levels of the modulation scheme in the calibration set. Each modulation level in the calibration set may have a code or number associated with it. The receiver can demodulate the message element by selecting the modulation level in the calibration set that most closely matches the observed modulation value of the message element, and can assign that associated code or number to the message element. If the message element has more than one modulation value, such as amplitude and phase, then the two associated codes or numbers may be concatenated to form the demodulated message element. Generally the modulation scheme includes integer Nlevel predetermined amplitude or phase levels. "RF" or radio-frequency refers to electromagnetic waves in the MHz (megahertz) or GHz (gigahertz) frequency ranges. A "short-form demodulation reference" is a compact demodulation reference exhibiting, generally, the maximum and minimum amplitude or phase levels of a modulation scheme, so that the receiver can calculate other levels by interpolation. Directional beams may be generated by multi-element antennas ("phased-array" antennas) using analog or digital means. As mentioned, "reciprocity" implies that an optimal beam direction for transmission is the same as an optimal beam direction for reception. "Directions", and the geographical "angles" representing them, may be used interchangeably. "Signal strength" or "signal level" may represent amplitudes, power such as received power or transmitted power density, or other measure of intensity.

Turning now to the figures, a first example shows, schematically, signals between a user device and a base station to select optimal beams at both ends.

FIG. 1A is a schematic showing an exemplary embodiment of a triangular transmission beam, according to some embodiments. In this non-limiting example, a polar plot shows the angular distribution of a transmitted signal for angles between 0 and 90 degrees. A transmitter 101 (star) transmits a triangular beam signal 103. A receiver 102 (diamond) at an angle of about 60 degrees, receives the signal. The signal 103 is depicted as a series of tapered arcs, in which the radial thickness of the arcs indicates the signal strength (amplitude or power density, for example) in each direction. Thus the triangle beam 103 has a higher signal strength at 90 degrees and a lower signal strength at 0 degrees, and has a monotonically-tapering signal strength in the angular range between those two angles, as indicated by the arc thicknesses. The receiver 102 can detect the triangle beam signal 103 and measure the as-received signal level, such as an intensity or amplitude or power density at the receiver 102.

Figure 1B:
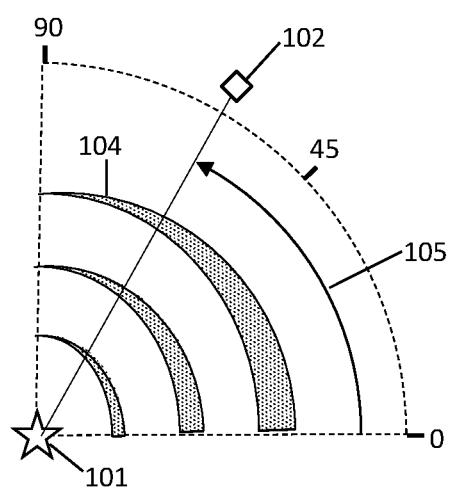
FIG. 1B is a schematic showing an exemplary embodiment of a triangular transmission beam with a reversed taper, according to some embodiments.

FIG. 1B is a schematic showing an exemplary embodiment of a triangular transmission beam with a reversed taper, according to some embodiments. In this non-limiting example, the transmitter 101 transmits an oppositely-tapered triangle beam signal 104, which the receiver 102 again receives. The receiver 102 can calculate a reception ratio R, equal in this case to the as-received signal strength of the first signal 103 divided by the as-received signal strength of the second signal 103. The receiver 102 can then determine, according to R and the first and second angles, an alignment angle 105 toward the receiver 102 from the transmitter 101, or the opposite alignment angle from the receiver 102 toward the transmitter 101. Thus the transmitter 101 and the receiver 102 can determine their alignment directions using just two brief triangle beam transmissions.

Figure 2A:
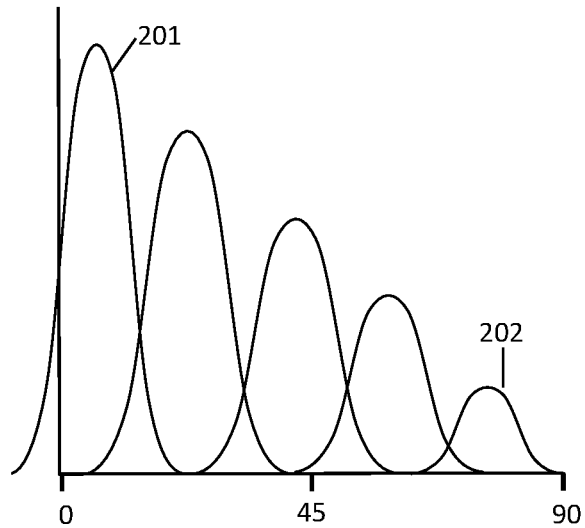
FIG. 2A is a schematic showing an exemplary embodiment of a triangular transmission beam assembled from narrow focused beams, according to some embodiments.

FIG. 2A is a schematic showing an exemplary embodiment of a triangular transmission beam assembled from narrow focused beams, according to some embodiments. There are many ways to construct a triangular beam using the capabilities of a phased-array antenna. In this non-limiting example, a triangular transmission beam is assembled by configuring a directional antenna to simultaneously generate multiple (in this case five) narrowly focused transmission beams, each in a different direction, each with a different transmission power or amplitude, and optionally each with a different width. For example, the highest signal level beam 201 is at a low angle near 0 degrees, while the lowest signal level beam 202 is at a high angle near 90 degrees. The transmitter causes the antenna to transmit all five narrow beams at the same time, but in different directions, so that the resultant distribution is the ramp-like triangular beam. For example, a phased-array antenna is a multi-element antenna with, preferably, digital control of each element. Such an antenna can be controlled and powered to transmit the five simultaneous, overlapping beams as shown. The resulting angular distribution of emission, in the range of angles between 0 and 90 degrees, is then the sum of the five focused beams. The configuration transmits a high signal strength near 0 degrees, a low transmitted signal near 90 degrees, and a roughly linear signal taper between the two angles.

Figure 2B:
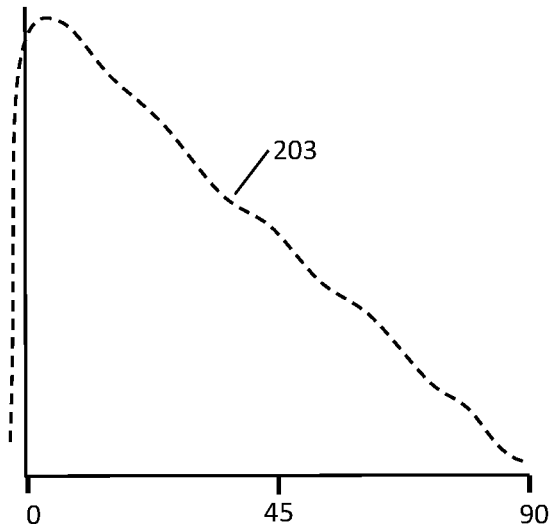
FIG. 2B is a schematic showing an exemplary embodiment of a triangular transmission beam resulting from multiple narrow focused beams, according to some embodiments.

FIG. 2B is a schematic showing an exemplary embodiment of a triangular transmission beam resulting from multiple narrow focused beams, according to some embodiments. In this non-limiting example, the resultant distribution of signal 203, generated by the five narrow beams of FIG. 2A, is plotted versus angle. Small ripples are present due to the individual narrow beams. In addition, the maximum at 0 degrees is rounded, and the distribution fails to reach exactly zero emission at 90 degrees. But otherwise, the distribution is triangular or ramp-shaped between the two angles. The slope of the ramp is configured to intersect zero emission at 90 degrees, and the maximum at 0 degrees, notwithstanding the end-effect imperfections shown. Such imperfections are generally due to the finite number of contributing elements in the antenna, but can be minimized by adjusting the gain and phase of the antenna elements. In general, the middle of the ramp region usually provides the most precise determination of the alignment angle, since the two ends of the ramp usually have the greatest distortions.

In some embodiments, the imperfections may be largely mitigated in analysis. First, the actual angular distribution of signal level can be measured versus angle, or calculated, or modeled in software, including the imperfections to be mitigated. Then, a correction function can be derived, based on the difference between an ideal ramp and the measured distribution, including the ripples and rounded corners. The correction function can then be applied to (that is, added to or otherwise combined with) the data before calculating the alignment direction, thereby reducing or eliminating the effects of nonlinearities. With such a correction function, it may not be necessary to generate a highly linear triangular distribution in practice, as long as the intensity varies monotonically between the first and second angles, and the correction function has been determined.

Figure 3:
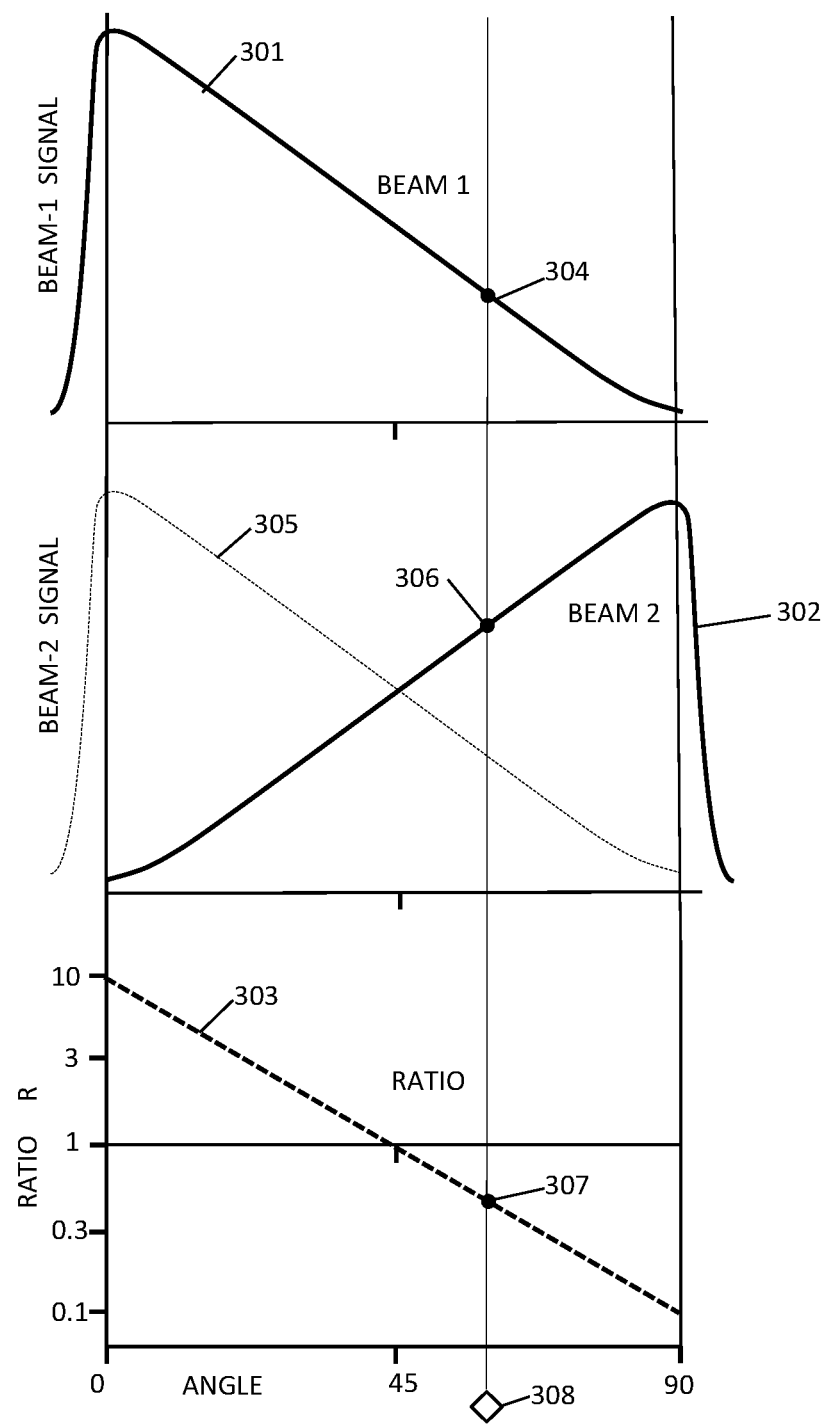
FIG. 3 is a schematic showing an exemplary embodiment of triangular transmission or reception beams in various configurations, according to some embodiments.

FIG. 3 is a schematic showing an exemplary embodiment of triangular transmission or reception beams in various configurations, according to some embodiments. In this non-limiting example, a first triangular beam 301 ("Beam-1") is shown versus angle, in the range between a first and a second angle which are again depicted as 0 to 90 degrees. Another triangular beam 302 ("Beam-2") is shown with an opposite slope. For visual comparison, Beam-1 is also shown, superposed in light dash 305. Also shown at the bottom is the ratio R 303, plotted in dash, which is equal to the Beam-1 signal divided by the Beam-2 signal at each angle in the angular range.

Also shown is a receiver 308 (diamond) at a particular angular location, which is about 60 degrees in the example. The receiver 308 receives Beam-1 301 and Beam-2 302, and measures the signal levels at the location of the receiver 308 for each beam. The as-received signal level during Beam-1 is shown as a dot 304, and the as-received signal during Beam-2 as another dot 306. A vertical line (not labeled) is an eye-guide. If the receiver 308 were at 45 degrees, the as-received signals from the two beams would be the same, and R would be 1, thereby indicating that the proper alignment angle is 45 degrees. In the depicted case, however, the receiver 308 is at 60 degrees, and consequently the received signals 304, 306 are different. The difference between the two received signals is due to the ramp shapes of the triangular beams 301 302. In this case, the ratio R at the receiver 308 position is about 0.5, as shown by a third dot 307, which indicates a 60 degree alignment angle for the receiver 308 location.

By measuring the as-received signals 304, 306 and calculating the ratio 307, and knowing the first and second angles, the receiver 308 can determine the alignment angle toward the other entity, using only two alignment transmissions occupying just two resource elements, and can thereby avoid the iterative back-and-forth message sequences of prior-art beam alignment procedures.

Figure 4:
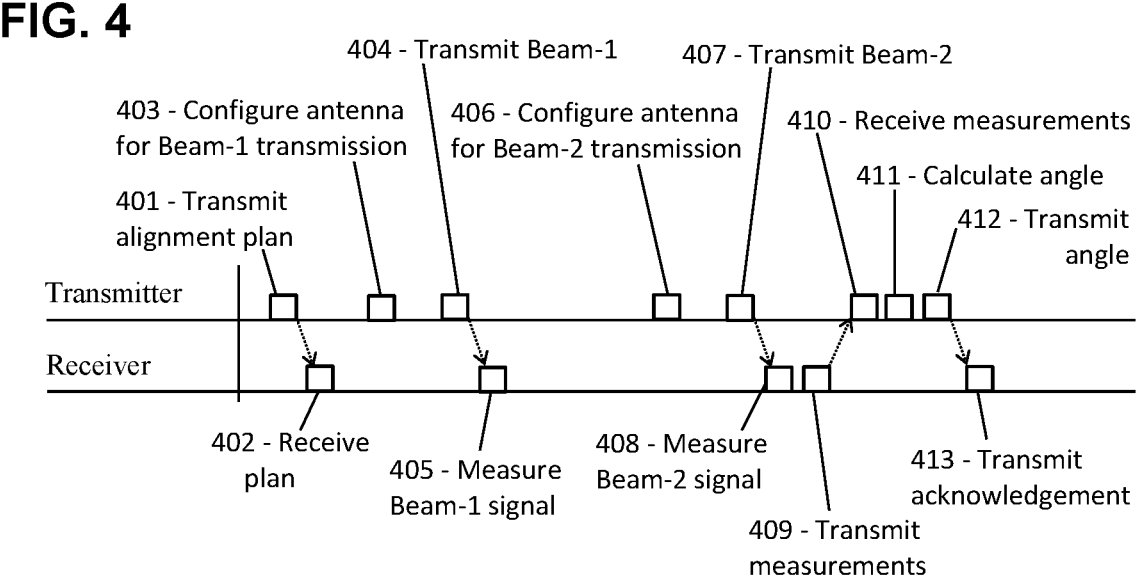
FIG. 4 is a sequence chart showing an exemplary embodiment of steps for a transmitter and receiver to cooperatively determine their alignment direction, according to some embodiments.

FIG. 4 is a sequence chart showing an exemplary embodiment of steps for a transmitter and a receiver to cooperatively determine the alignment angle between them, according to some embodiments. As depicted in this non-limiting example, actions by the transmitter are shown as boxes on a first line, and actions of the receiver are shown on the second line. Time is horizontal. Arrows indicate causation. At 401, the transmitter transmits a message to the receiver, scheduling the alignment pulses, and if necessary specifying the timing and frequency for the two pulses. The receiver receives the planning message at 402. The transmitter then 403 configures its antenna for transmission of a triangular Beam-1 signal, with a ramped signal distribution versus angle. The Beam-1 signal, in this case, occupies a single resource element. At 404 the transmitter transmits Beam-1, and the receiver measures the as-received signal amplitude at 405. At 406, after a prearranged delay, the transmitter reconfigures its antenna for Beam-2, which is another triangular beam with a linear ramp signal versus angle, but now in the opposite angular direction as Beam-1. The transmitter transmits Beam-2 at 407. At 408 the receiver measures the as-received signal for Beam-2. At a predetermined time 409, the receiver transmits a data message, including the measurement data (or a ratio based on the data), to the transmitter. At 410, the transmitter receives the measurement data, calculates the alignment angle at 411, and transmits the alignment angle to the receiver at 412. Preferably the transmitter uses a narrow beam (not a triangular beam), aimed according to the alignment angle, to transmit the alignment message. At 413, the receiver adjusts its antenna for the alignment angle (plus 180 degrees, from the receiver's point of view), and transmits an acknowledgement using a narrow beam aimed at the transmitter at 413.

Optionally, the planning message 401 may specify the times and frequencies of the two triangle beams, if not already determined by convention or prior RRC message, for example. The planning message may also provide a specific time and resources (for example, a grant) for the receiver to transmit the data message 409 back to the transmitter, thereby avoiding unnecessary messaging and delays. The transmitter can interpret the data provided by the receiver and calculate the alignment direction, because the transmitter knows the angles and the ramp properties of beams. After receiving the alignment message, the receiver can also adjust its transmission and reception beams to be focused on the transmitter, thereby completing the mutual beam alignment.

It is assumed, in this example, that the receiver has a digital compass or other means for determining geographical directions, so that the receiver and transmitter can use a common coordinate system in determining their alignment directions toward the other. However, in a particular case, there may be no compass, and hence the receiver may not be able to determine the alignment direction from the transmitter's alignment message. In that case, the receiver can align its beams by performing a second alignment procedure, but now with the receiver transmitting the triangular beams while the transmitter measures them (that is, the roles are reversed). The transmitter then transmits the measurement results back to the receiver, which calculates the ratio and determines the alignment angle from the receiver toward the transmitter. Hence, both the transmitter and the receiver have then achieved beam alignment without relying on a common coordinate system, and without assuming that the same alignment angle is optimal for both entities.

The following example shows yet another way for the two entities to determine their alignment directions, now using triangular reception beams instead of transmission beams.

Figure 5:
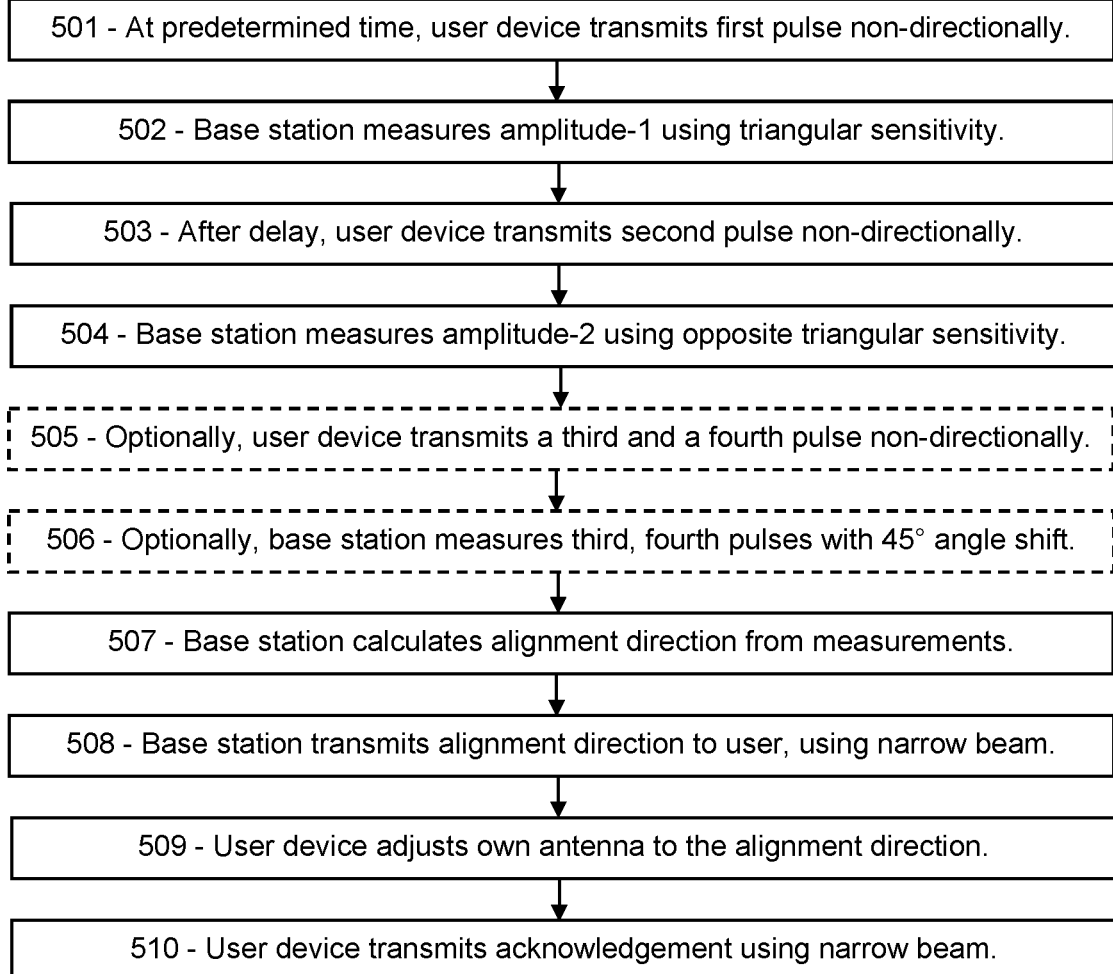
FIG. 5 is a flowchart showing an exemplary embodiment of steps for a user device and a base station to cooperatively determine the alignment direction, according to some embodiments.

FIG. 5 is a flowchart showing an exemplary embodiment of steps for a user device and a base station to cooperatively determine the alignment angle, according to some embodiments. As depicted in this non-limiting example, the user device transmits non-directional signal pulses (that is, isotropic pulses, not triangular beams). The base station configures its antenna for a triangular sensitivity distribution and detects the non-directional pulses, thereby determining the ratio. The base station then calculates the alignment angle based on the known first and second angles, and other properties of the ramps. This version enables the base station to determine the alignment direction even if the user device is not capable of directional beams at all, and therefore this method may be more applicable to low-complexity devices and sensors.

At 501, at a pre-arranged schedule, a user device transmits a first pulse non-directionally. The first pulse, and the other pulses, are isotropic non-directional transmissions occupying a single resource element, in this example. The pulses are non-directional, that is, with uniform amplitude in all horizontal directions, or at least uniform within a particular range of angles that includes the intended recipient.

The base station, on the other hand, has a phased-array antenna which is capable of receiving signals using a triangular sensitivity distribution versus angle (that is, a triangular reception beam). The base station prepares a triangular reception beam in which the sensitivity varies monotonically according to the angle of arrival of the electromagnetic energy, between a first angle and a second angle. At 502, the base station uses the triangular reception beam to receive and measure the amplitude of the first pulse, thereby obtaining a first amplitude value. At 503, the user device transmits a second pulse, also non-directionally. At 504, the base station receives the second pulse using another triangular reception beam with the opposite ramp direction.

In one embodiment, the optional steps 505 and 506, in dash, may be ignored. The base station then, at 507, calculates the alignment angle from the signal measurements and the known first and second angles of its triangular reception beams, and thereby determines its alignment direction toward the user device.

At 507, the base station calculates the alignment direction based on its own signal measurements, and on the known angles employed in the triangular beams. The base station then 508 transmits a message to the user device indicating the alignment angle (or the same plus 180 degrees). Preferably, the base station uses a narrow transmission beam aimed in the alignment direction to transmit the message. At 509, the user device adjusts its own transmission and reception beam directions according to the alignment angle and, using a narrow beam aimed at the base station, transmits an acknowledgement at 510.

Returning to the optional steps, an additional procedure may be employed to avoid the ends of the ramp region, where accuracy may be compromised. Two more triangular beams are prepared, but with a 45 degree angular shift relative to the first pair of beams. At certain angles where the first two beams are least accurate, the second two beams are the most accurate, and vice versa. The receiving entity can then select which set of beams to use in calculating the alignment angle, to obtain the most accurate result.

Implementing this option, at 505, the user device may transmit a third pulse and a fourth pulse, all identical and all non-directional. At 506, the base station can receive the third and fourth pulses using triangular reception beams similar to those used for the first and second pulses, but now rotated in angle by 45 degrees (or other suitable angular shift). Acquiring data with two sets of triangular beams, shifted in angle, may improve angular precision and may resolve ambiguities due to nonlinear beam shapes, especially in the regions at the ends of the ramps. The measurements in the middle of a ramp are expected to be more reliable than the measurements at the ends of the ramp, as discussed in more detail below and especially FIG. 8.

In one embodiment, the base station may calculate a first ratio R1, using pulses 1 and 2, and a second ratio R2, using pulses 3 and 4 (which are rotated by 45 degrees). The base station may then select whichever of R1 and R2 is closer to 1.0 (representing the middle of the ramp), and may derive the alignment angle from that selected ratio. Alternatively, the base station can select which measurements according to a first difference between the signals detected for pulses 1 and 2, and a second difference between the signals detected for pulses 3 and 4. The base station can then select whichever pair of signals has the smallest difference (in magnitude), and can then calculate the ratio and the alignment angle from that selected pair of signals. In a third method, the middle of the ramp is indicated by a ratio of 1.0, or by a small difference in signal values. The beam pair that has a ratio closest to 1.0 (or the smallest difference in received signals) is thereby closest to the middle of the ramp, avoiding the end-effect nonlinearities, and hence is likely to provide the best angular resolution.

Figure 6:
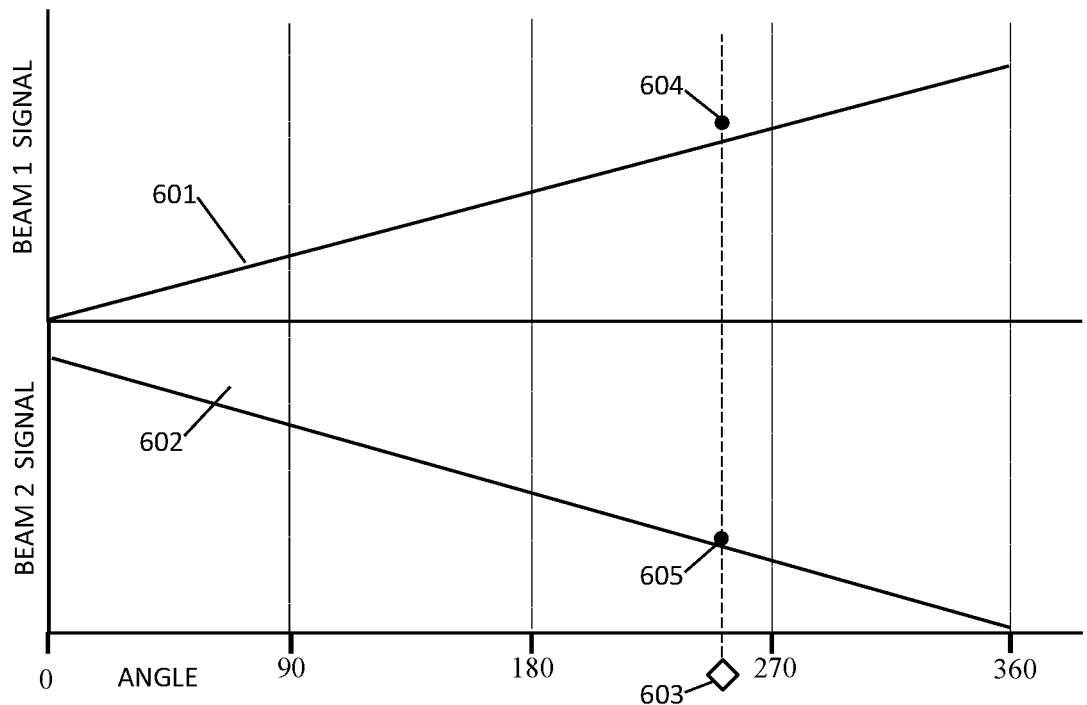
FIG. 6 is a schematic showing an exemplary embodiment of triangular beams distributed to cover 360 degrees, according to some embodiments.

FIG. 6 is a schematic showing an exemplary embodiment of triangular beams distributed to cover 360 degrees, according to some embodiments. In this non-limiting example, a first triangular beam 601 (Beam-1) is configured as a ramp increasing from 0 degrees around a circle to 360 degrees. A second beam 602 (Beam-2) is a similar ramp but decreasing over the same range of angles. A receiver 603 measures the amplitudes 604 and 605 at the receiver's location, calculates a ratio of those values, and thereby determines its angular position, or alignment direction, relative to the transmitter, which in this case is about 250 degrees of angle. By covering the entire 360-degree range with the triangular beams, two entities can determine their alignment directions, anywhere around the transmitting entity, using just two triangular beam pulses.

In practice, a single phased-array antenna is generally unable to cover such a wide angular range. Therefore, the triangular beams may be generated by a plurality of antennas, such as four antennas, oriented and powered so as to simultaneously transmit each quadrant of the triangular beams as shown.

Figure 7:
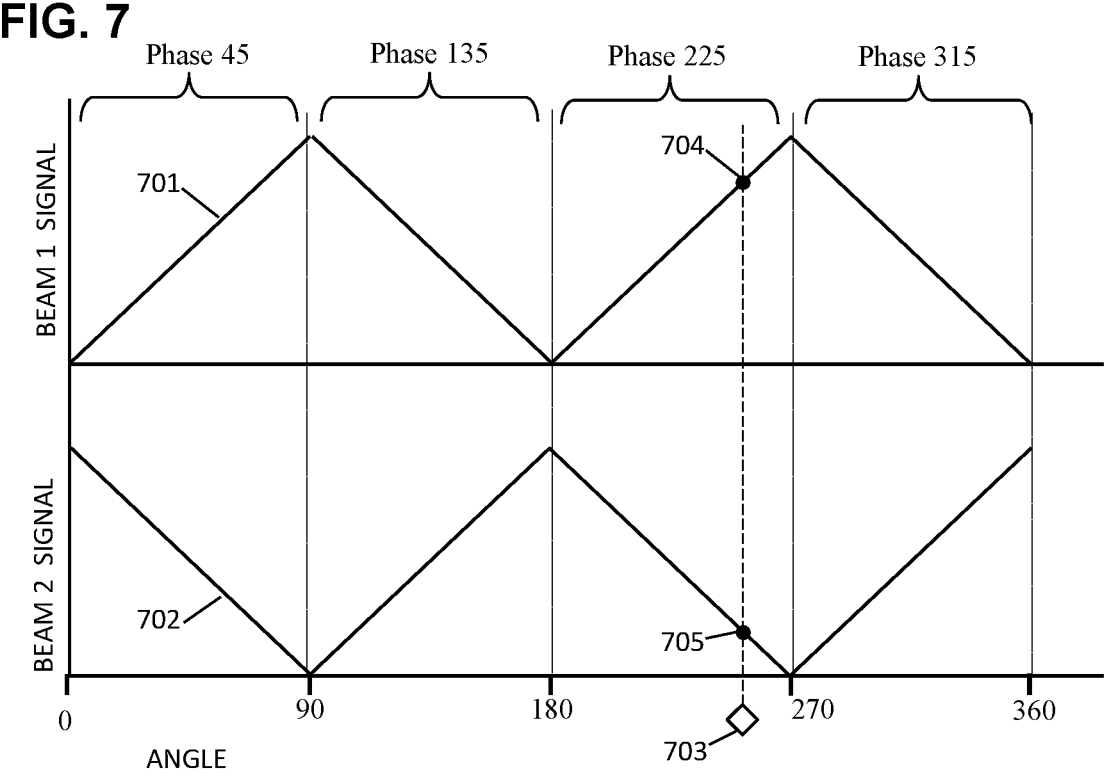
FIG. 7 is a schematic showing an exemplary embodiment of triangular beams modulated to cover 360 degrees, according to some embodiments.

FIG. 7 is a schematic showing an exemplary embodiment of triangular beams modulated and distributed to cover 360 degrees of angle, according to some embodiments. As depicted in this non-limiting example, a first triangle Beam-1 signal is transmitted throughout 360 degrees, with signal strength varying in a ramped fashion within each 90-degree quadrant. A second triangular Beam-2 is then transmitted, also covering 360 degrees of angle but with a reversed ramp in each quadrant. The beams are modulated according to QPSK (quadrature phase-shift keying) in each quadrant, thereby enabling a receiver to identify signals in each quadrant uniquely.

(A note on terminology: It may be confusing that both phases and angles are measured in degrees. Therefore, parameters will be specified in this example as "degrees of phase" or "degrees of angle". For example, each quadrant contains a ramped triangle beam in an angular region, such as 0-90 degrees of angle in the first quadrant, and the beam in that quadrant is phase-modulated according to 45 degrees of phase.)

As depicted, a first beam 701 is shown as an upward ramp in 0-90 degrees of angle, then downward for the next 90 degrees of angle, and so forth. A second beam 702 has a reversed shape. The beams 701 and 702 are modulated according to QPSK using, in this example, phases of 45, 135, 225, and 315 degrees of phase in each quadrant, respectively, as indicated across the top. Thus the receiver can detect the signal from each triangle beam, and can also measure the phase of the signals to determine which quadrant is being detected, and can thereby determine the alignment angle uniquely.

A receiver 703 sits at about 250 degrees of angle in this case, and receives both beams 701-702. The receiver 703 can measure the signal strength and phase of each beam 701-702, and thereby determine the alignment angle at the receiver's 703 location. For example, the receiver 703 can measure the first beam 701 signal strength, indicated by a dot 704, and can then measure the second beam 702 signal strength (dot 705). The receiver 703 can calculate the ratio R of those two measurements, but not the alignment angle because of the quadrant ambiguity in that there are four possible angular positions consistent with R, in different quadrants. Therefore, the receiver 703 measures the phase of the signals as well as their amplitudes. In this case, the phase is 225 degrees of phase, which indicates that the receiver 703 is in the third quadrant, which spans an angular region of 180-270 degrees of angle, as shown. From the amplitude and phase measurements, the receiver 703 can determine its alignment angle of 250 degrees of angle, unambiguously.

Transmitting such amplitude-controlled and phase-controlled beams, around a full 360 degrees of angle, may be challenging for many phased-array antennas. However, this can be accomplished by use of multiple antennas, such as four antennas, each pointed in a different direction, and powered to transmit one of the triangle beam quadrants per antenna at a single phase. Such an arrangement greatly simplifies the electronics required.

It may be noted that angles close to a peak, such as 90, 180, etc. degrees of angle, are particularly problematic since antennas cannot generally produce such sharp transitions in slope, nor sharp transitions in phase. Some intermingling and distortions are unavoidable in those angular regions. Therefore, the following example shows how to mitigate that problem and obtain high-precision alignment results throughout 0-360 degrees.

Figure 8:
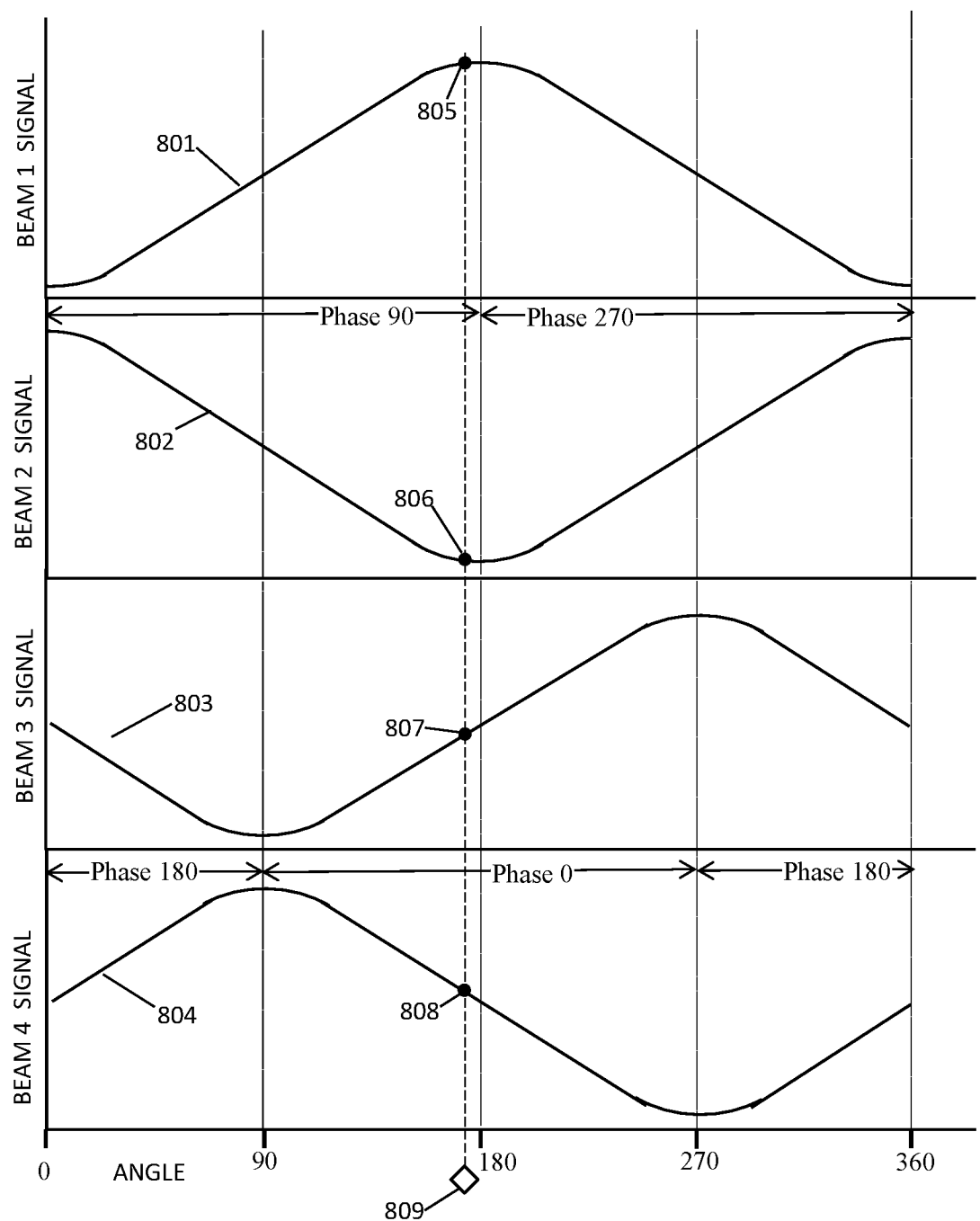
FIG. 8 is a schematic showing an exemplary embodiment of triangular beams shifted in angle by 90 degrees, according to some embodiments.

FIG. 8 is a schematic showing an exemplary embodiment of triangular beams shifted in angle by 90 degrees, according to some embodiments. According to this non-limiting example, a first wireless entity transmits four triangular beams, Beam-1, Beam-2, Beam-3, and Beam-4 labeled 801, 802, 803, and 804 respectively. Beam-1 is an upward ramp from 0 to 180 degrees of angle, then downward for another 180 degrees. Beam-2 is a mirror image of Beam-1, ramping downward in 0-180, then up. Beam-3 is similar to Beam-1 but shifted in angle by 90 degrees, so instead of peaking at 180 degrees of angle, Beam-3 peaks at 270 degrees, and then ramps down. Beam-4 is a mirror image of Beam-3.

Beam-1 and Beam-2 are phase-modulated according to BPSK (binary phase-shift keying), which includes just two phases separated by 180 degrees of phase. In this example, Beam-1 is modulated with a phase of 90 degrees of phase, within the angular range of 0-180 degrees of angle. In the angular range of 180-360 degrees of angle, Beam-1 is modulated according to 270 degrees of phase. Beam-2 is modulated the same way. This is indicated on the chart for Beams 1 and 2.

Beam-3 and Beam-4 are also BPSK phase-modulated, but with different phase values and quadrants. In the angular range of 90-270 degrees of angle, Beam-3 and Beam-4 are phase-modulated at 0 degrees of phase, and in the angular range of 270-90 degrees of angle, Beam-3 and Beam-4 are phase-modulated at 180 degrees of phase, as indicated on the chart for Beams 3 and 4.

The signal distributions are shown with rounded peaks, instead of the sharp peaks of the previous figures, to illustrate a potentially problematic distortion. Generating a distribution with a sharp peak would require a very large number of individually-controlled antenna elements, and switching phase modulation inevitably involves some overlap. For the foreseeable future, practical antennas are expected to be able to produce distributions approximating a linear ramp versus angle, and uniform phase, throughout a linear center-ramp regions, but with inevitable end-effect imperfections as shown. The rounded peaks tend to provide poor angular resolution in determining the alignment angle, because the variation of the ratio with angle becomes smaller than a noise level in the vicinity of each peak. In addition, the phase modulation is likely distorted by crosstalk where the two modulations partially overlap.

To obtain high angular resolution throughout the 0-360 range, in this example, four beams are generated, in which two of the beams are displaced in angle by 90 degrees of angle. As a consequence, any device residing near a peak in one set of beams will fall neatly in the middle of the ramp region of the other pair of beams. By selecting which pair of beams to analyze, and selecting data preferentially from the mid-ramp regions, receivers can determine a precise alignment angle anywhere around the 360-degree range of angles.

To illustrate this, a wireless entity 809 is shown at about 175 degrees of angle, very close to the 180-degree peak of Beams 1 and 2 (801, 802), and therefore is clearly in the rounded region, which provides poor resolution in determining the alignment direction, as mentioned. However, the entity 809 is in the mid-ramp regions of Beams 3 and 4 (803, 804) where high resolution is obtainable since it avoids the end-effect distortions.

The entity 809 measures the signal strength in all four beams 801-804. The resulting measurements are shown as dots 805, 806, 807, and 808. Using those measurements, the alignment direction can be determined precisely. The entity 809 selects which two beams to use in calculating the alignment angle. In one embodiment, the entity 809 calculates the alignment angle using Beams 1 and 2, and again using Beams 3 and 4. If the corresponding alignment angles are closer to 90 or 270 degrees of angle, the entity 809 retains the result from Beams 1 and 2, and discards the other result. If the alignment angle is closer to 0 or 180 degrees, it retains the second calculated value from Beams 3 and 4.

At least three other methods can be used to select the preferred beam measurements to use or discard, so as to avoid the end-effect distortions. In a first method, already discussed, the alignment angle is calculated using both pairs of measurements, and if the result is close to a peak in one of the beam pairs, that calculated value is ignored. In a second method, the difference between the first two signal levels 805-806 is calculated, and a second difference between the second two signal levels 807-808 is calculated; then, whichever difference is larger in magnitude is discarded. In a third method, the ratio is calculated for the first pair, and a second ratio for the second pair of measurements; whichever ratio is farther from 1.0 is discarded. In each case, the alignment angle is calculated using the non-discarded pair of measurements. In a special case that both pairs of beams provide similar signal ratios and similar signal differences, two alignment angles can be calculated for the two pairs of beams, and the results can be averaged. Using any of the above selection methods, or other selection methods that practitioners may devise to avoid the peak regions, improved angular resolution may be obtained. Using the disclosed method, and transmitting just four triangular pulses, the wireless entities can simultaneously align their transmission and reception beams precisely throughout the full 0-360 range.

Figure 9:
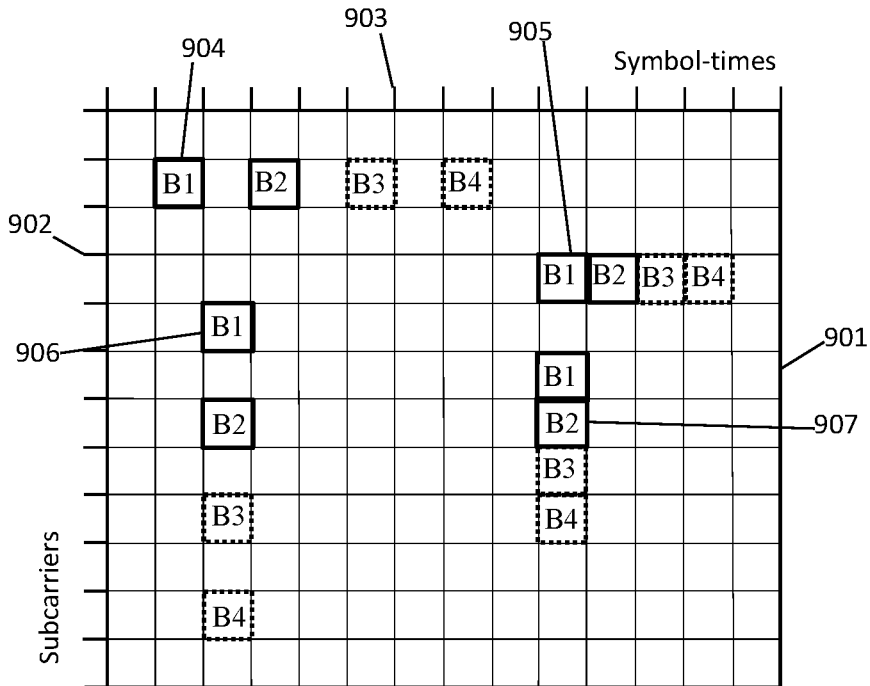
FIG. 9 is a schematic showing an exemplary embodiment of a resource grid containing triangular beam transmissions, according to some embodiments.

FIG. 9 is a schematic showing an exemplary embodiment of a resource grid containing triangular beam transmissions, according to some embodiments. As depicted in this non-limiting example, a resource grid 901 is a matrix of resource elements, each resource element defined by subcarriers 902 in frequency and symbol-times 903 in time. Depicted are four sets of triangular beam transmissions. Two of the transmissions are time-spanning sets 904 and 905, and two are frequency-spanning sets 906, 907. (As mentioned, a time-spanning message occupies multiple symbol-times at a single subcarrier, and a frequency-spanning message occupies multiple subcarriers at a single symbol-time.)

The first time-spanning set 904 includes a triangular transmission Beam-1 (B1) ramped in a first orientation (such as increasing with increasing angle), followed after a short gap by a Beam-2 (B2) having the opposite ramp orientation (such as decreasing with increasing angle). Optionally, in dash, those transmissions may be followed by Beams 3 and 4 (B3, B4) with an angular shift, as described in the previous figure. For example, a base station can transmit Beams 1 and 2, and optionally Beams 3 and 4, in which Beams 3 and 4 are shifted in angle relative to Beams 1 and 2. A user device (or multiple user devices) can measure the received amplitudes at the user device's location during each triangular beam transmission. With those amplitude measurements, and knowledge of the angles involved, the user device can calculate its alignment direction toward the base station. However, if a user device does not know the angles and other parameters employed by the base station, the user device can transmit its raw amplitude measurements to the base station, and the base station can calculate the alignment direction and send a message back to the user device, indicating that result.

In the first time-spanning set 904, the individual beam transmissions are spaced apart by a one-symbol-time gap, configured to allow user devices (particularly reduced-capability user devices) to process the measurement data before acquiring another measurement. Depending on the properties of the network users, such a gap may not be necessary in many networks. Therefore an alternate example is provided, of a time-spanning set 905 of triangular transmission beams without intervening gaps.

The first frequency-spanning set 906 includes B1 and B2, and optionally B3 and B4 triangular transmission beams transmitted simultaneously in subcarriers separated from each other by a small space of one subcarrier. The space is to help user devices to isolate each beam signal and measure the received amplitude accurately, without crosstalk from a signal in an adjacent subcarrier. However, such spaces may not be necessary. Therefore, a second frequency-spanning set 907 is shown, illustrating a more compact transmission in two (or four) successive subcarriers.

The same figure can alternatively be interpreted as referring to triangular reception beams instead of triangular transmission beams. In that case, each B1-B4 beam may involve a first entity (not shown) transmitting non-directional pulses, while a second entity receives them with triangular reception beams. For example, the base station can transmit a non-directional signal, such as an isotropic sine wave at the subcarrier frequency, during each of B1-B4 resource elements, and a user device, equipped with a sufficiently competent antenna, may receive the signals using a triangular reception beam having a ramp-shaped sensitivity distribution versus angle. After receiving two or four such transmissions, filtered by the variously-ramped triangular reception beams, the user can then calculate ratios of the as-received amplitudes. Knowing the angles employed in the triangular reception beams, the user can calculate the alignment direction toward the base station. Each user device can then transmit a message to the base station, using a narrow transmission beam (not a triangular beam), informing the base station of the alignment direction thus determined.

As shown, the alignment procedure may involve two or four triangular beams, which may be triangular reception or transmission beams, and they may be transmitted as a time-spanning or frequency-spanning message, with or without intervening gaps or spaces. In each case, one receiver or a multitude of receivers can determine their alignment angle rapidly, without iteration.

Figure 10:
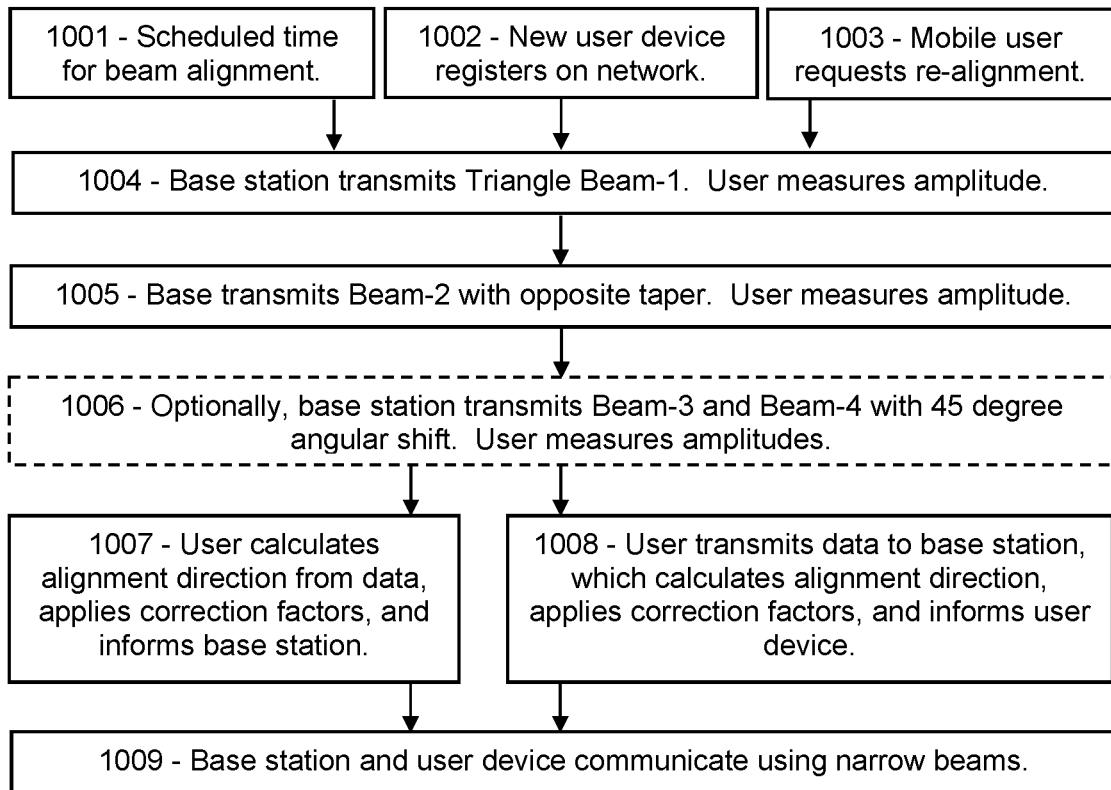
FIG. 10 is a flowchart showing an exemplary embodiment of a procedure for a base station to assist a user device in aligning beams, according to some embodiments.

FIG. 10 is a flowchart showing an exemplary embodiment of a procedure for a base station to assist a user device in aligning beams, according to some embodiments. As depicted in this non-limiting example, a beam alignment procedure may be triggered by one of at least three events, such as: 1001 a previously scheduled time for beam-alignment triangular pulses (for example, the first symbol-time of the first slot of each frame); 1002 a new user device has completed registration on the network and therefore does not yet know the alignment direction toward the base station; or 1003 a mobile user device has changed position and requests a re-alignment. In either case, at 1004, the base station then transmits a first triangle Beam-1, with a ramped signal distribution versus angle, as described in previous examples. The user device measures the received amplitude (or power, etc.). At 1005, the base station transmits Beam-2, which is another triangle beam but with the signal distribution ramped in the opposite angular direction, and the user device measures it. If necessary to improve angular resolution at certain endpoints (such as 90 degrees of angle), the base station may transmit an additional set of beams, Beam-3 and Beam-4. at 1006. Beams 3 and 4 may be transmitted with an angular shift (such as 45 degrees of angle), so that the endpoints of the Beam-1 and Beam-2 ramps then fall in the mid-ramp regions of Beams 3 and 4, and vice-versa. (Whether the Beam-3 Beam-4 sequence is necessary will depend on how closely the triangular beams can be formed matching an ideal triangle shape, which generally depends on the size and complexity of the base station's antennas.)

In one version, at 1007, the user device analyzes the data and calculates the alignment direction. To do this calculation, the user device needs to know the specific angles employed by the base station in constructing the triangular transmission beams. The user device can also apply correction factors if known, such as factors to compensate for deviations from linearity of the beam intensity versus angle, and thereby improve the angular resolution. The user device may then transmit a message, using a narrow (not triangular) beam focused on the base station, informing the base station of the alignment angle.

In a second version, at 1008, the user device can transmit the measurement data to the base station, presumably using a non-directional transmission since the user device does not yet know the alignment direction. The base station can perform the analysis using the known angles and correction factors. The base station can then transmit a message to the user device, using a narrow beam focused on the user device, informing it of the alignment angle.

In either case, the base station and the user device can communicate using narrow beams 1009, thereby obtaining improved signal quality with less transmission power and less background generation, having aligned their transmission and reception beams using just two (or optionally four) triangle beam pulses.

As a further option, the network may include certain user devices that are capable of configuring triangular reception beams, and that prefer to determine the alignment direction themselves. To accommodate the such user devices, the base station may transmit, after Beam-1 and Beam-2, and after the optional Beam-3 and Beam-4, two or four additional transmissions of non-directional energy. The certain user devices can then receive the first non-directional transmission using a first triangular reception beam, and receive the second non-directional transmission using a second triangular reception beam with a slope direction opposite to the first triangular reception beam (and optionally the third and fourth non-directional pulses using angle-shifted triangular reception beams). The certain user devices can then calculate a ratio of the detected amplitudes with those reception beams, and knowing the angles involved, can calculate the alignment angle toward the base station.

Figure 11:
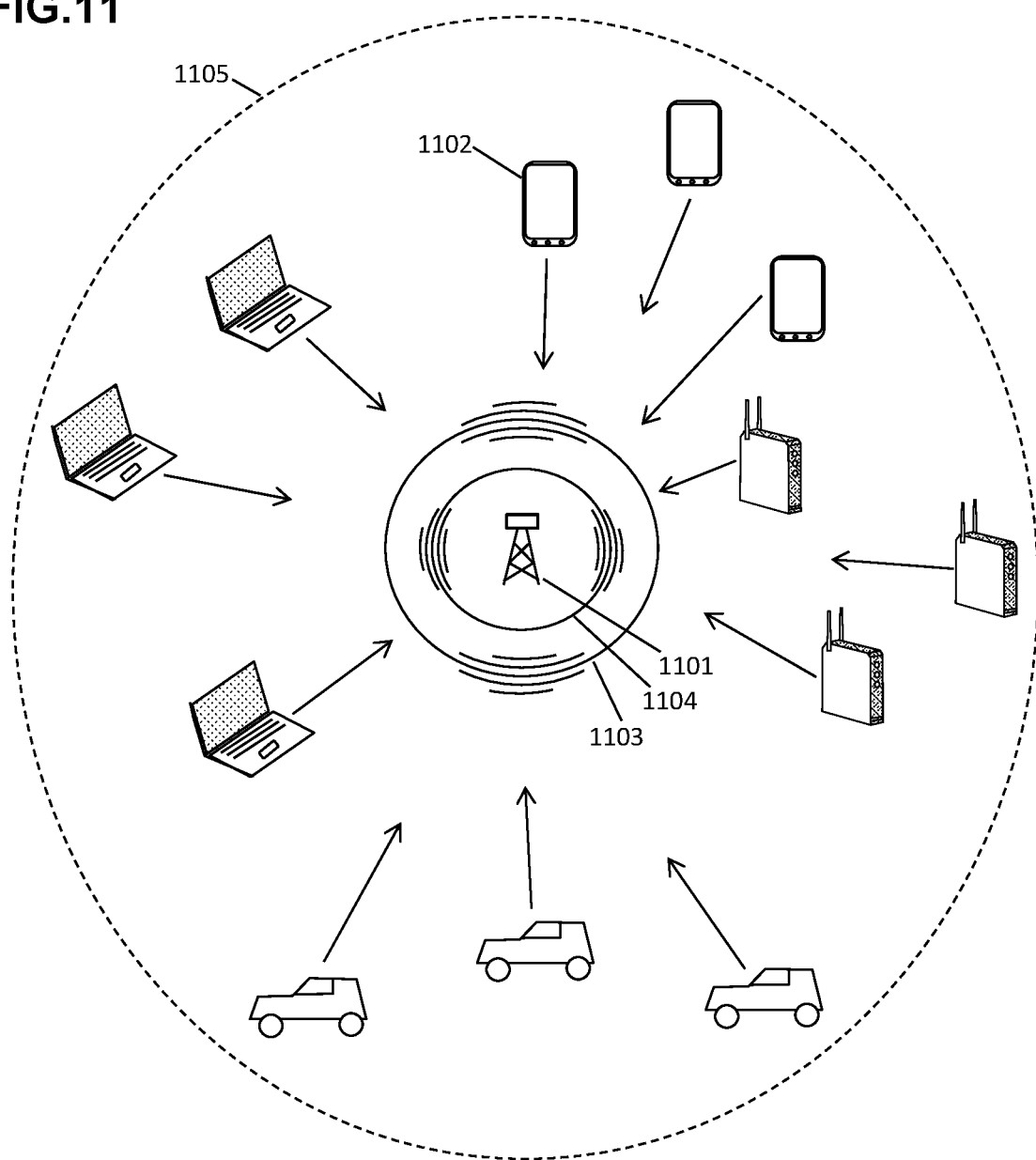
FIG. 11 is a schematic showing an exemplary embodiment of a wireless network with triangular beams, according to some embodiments.

FIG. 11 is a schematic showing an exemplary embodiment of a wireless network with triangular beams, according to some embodiments. As depicted in this non-limiting example, a base station 1101 of a wireless network 1105 is surrounded by user devices 1102 and transmits a first triangular beam 1103 and a second triangular beam 1104. The purpose is to assist each user device 1102 in determining its alignment direction (arrows, not labeled). In a managed network, user devices communicate exclusively with the base station; hence, the alignment directions are all oriented toward the base station.

Each of the triangular beams 1103, 1104 is transmitted around a 360 degree circle as shown. Each triangular beam 1103 1104 includes regions of higher and lower signal strength, as suggested by nested arcs. At the angles where the first triangular beam 1103 is highest, the second triangular beam 1104 is lowest, and vice-versa. In addition, although not explicitly depicted here, the signal strength of each beam tapers, in a substantially linear ramp, down from a first angle of maximum signal to a second angle of minimum signal, and then increases linearly from the second angle to a third angle corresponding to another peak. For example, the first triangular beam 1103 may have maxima at 0 degrees (north toward the top of the page) and at 180 degrees, and minima at 90 and 270 degrees. The second triangular beam 1104 may have maxima at 90 and 270 degrees, and minima at 0 and 180 degrees. In addition, the beams 1103 and 1104 may be modulated differently in different quadrants, to enable the user devices 1102 to distinguish between diametrically opposite directions. For example, the first triangular beam 1103 may be modulated according to a first phase in the angular range of 0 to 180 degrees, and a second phase in the angular range of 180 to 360 degrees (going clockwise around the figure), whereas the second triangular beam may be modulated according to the first phase in the angular range 90 degrees (around the bottom) to 270 degrees, and the second phase in the range of 270 degrees (around the top) to 90 degrees.

Each user device 1102 may be configured to receive the first and second triangular beams 1103 1104, and to measure the received signal level for each beam. The user device 1102 may then calculate a ratio of the two received signal levels, and may calculate the alignment angle according to the angles used by the base station in generating the triangular beams 1103 1104. Alternatively, each user device 1102 may transmit the measurement data to the base station 1101, and the base station 1101 may calculate the alignment angles and transmit the results back to the user device 1102. In either case, the base station 1101 and all of the user devices 1102 in the network 1105 may determine their alignment directions using just two triangular beams 1103 1104 as shown.

Optionally, the base station 1101 may transmit a third and a fourth triangular beam (not shown) rotated by 45 degrees in angle, to provide improved angular resolution at the maxima and minima of the first two triangular beams 1103 1104. For example, in the present example, the third and fourth triangular beams may have maxima and minima at 45, 135, 225, and 315 degrees of angle, and may thereby provide linear ramp regions at the angles where the first two beams 1103 1104 are maximum and minimum (specifically, at 0, 90, 180, and 270 degrees of angle). In that case, each user device 1102 may measure its received signal for all four of the beams, select the pair that provides the most linear signal distribution versus angle at the location of the user device 1102, and calculate the alignment angle using the selected beam pair.

Optionally, the user device 1102 or the base station 1101 may apply a correction function to the data analysis, configured to negate certain nonlinearities in the angular shape of the triangular beams 1103 1104, such as ripples or rounded corners, and thereby obtain improved angular resolution.

Optionally, the user device 1102 or the base station 1101 may verify the alignment determination by transmitting a small number, such as three, test signals. The test signals may be transmitted using three narrow (not triangular) beams, each aimed at the calculated alignment direction plus or minus a small angle (such as the width of the narrow beam). The receiving entity can measure the signal level of all three of the test signals and determine whether the best signal is received in the test beam that is centered on the alignment direction, as is expected, or whether one of the other two test beams is better.

The systems and methods disclosed herein may enable base stations and wireless devices to align their transmission and reception beams in a managed network. In a non-managed network, such as an ad hoc network among mobile user devices, the communicating entities can align their beams in the same way, but with one of the mobile user devices temporarily assuming the role of the base station.

The systems and methods may enable wireless devices to align their reception and transmission beam directions quickly and efficiently, with very little consumption of resource elements, with very low power usage, in a low-complexity manner that even reduced-capability devices can handle. A single set of triangle beams may enable a large number of user devices to determine their alignment directions simultaneously, further minimizing time and energy usage. The systems and methods may thereby provide improved communication reliability with less energy consumption and less background generation, thereby enhancing network function and user satisfaction overall.

The wireless embodiments of this disclosure may be aptly suited for cloud backup protection, according to some embodiments. Furthermore, the cloud backup can be provided cyber-security, such as blockchain, to lock or protect data, thereby preventing malevolent actors from making changes. The cyber-security may thereby avoid changes that, in some applications, could result in hazards including lethal hazards, such as in applications related to traffic safety, electric grid management, law enforcement, or national security.

In some embodiments, non-transitory computer-readable media may include instructions that, when executed by a computing environment, cause a method to be performed, the method according to the principles disclosed herein. In some embodiments, the instructions (such as software or firmware) may be upgradable or updatable, to provide additional capabilities and/or to fix errors and/or to remove security vulnerabilities, among many other reasons for updating software. In some embodiments, the updates may be provided monthly, quarterly, annually, every 2 or 3 or 4 years, or upon other interval, or at the convenience of the owner, for example. In some embodiments, the updates (especially updates providing added capabilities) may be provided on a fee basis. The intent of the updates may be to cause the updated software to perform better than previously, and to thereby provide additional user satisfaction.

The systems and methods may be fully implemented in any number of computing devices. Typically, instructions are laid out on computer readable media, generally non-transitory, and these instructions are sufficient to allow a processor in the computing device to implement the method of the invention. The computer readable medium may be a hard drive or solid state storage having instructions that, when run, or sooner, are loaded into random access memory.

Inputs to the application, e.g., from the plurality of users or from any one user, may be by any number of appropriate computer input devices. For example, users may employ vehicular controls, as well as a keyboard, mouse, touchscreen, joystick, trackpad, other pointing device, or any other such computer input device to input data relevant to the calculations. Data may also be input by way of one or more sensors on the robot, an inserted memory chip, hard drive, flash drives, flash memory, optical media, magnetic media, or any other type of file—storing medium. The outputs may be delivered to a user by way of signals transmitted to robot steering and throttle controls, a video graphics card or integrated graphics chipset coupled to a display that maybe seen by a user. Given this teaching, any number of other tangible outputs will also be understood to be contemplated by the invention. For example, outputs may be stored on a memory chip, hard drive, flash drives, flash memory, optical media, magnetic media, or any other type of output. It should also be noted that the invention may be implemented on any number of different types of computing devices, e.g., embedded systems and processors, personal computers, laptop computers, notebook computers, net book computers, handheld computers, personal digital assistants, mobile phones, smart phones, tablet computers, and also on devices specifically designed for these purpose. In one implementation, a user of a smart phone or Wi-Fi-connected device downloads a copy of the application to their device from a server using a wireless Internet connection. An appropriate authentication procedure and secure transaction process may provide for payment to be made to the seller. The application may download over the mobile connection, or over the Wi-Fi or other wireless network connection. The application may then be run by the user. Such a networked system may provide a suitable computing environment for an implementation in which a plurality of users provide separate inputs to the system and method.

It is to be understood that the foregoing description is not a definition of the invention but is a description of one or more preferred exemplary embodiments of the invention. The invention is not limited to the particular embodiments(s) disclosed herein, but rather is defined solely by the claims below. Furthermore, the statements contained in the foregoing description relate to particular embodiments and are not to be construed as limitations on the scope of the invention or on the definition of terms used in the claims, except where a term or phrase is expressly defined above. Various other embodiments and various changes and modifications to the disclosed embodiment(s) will become apparent to those skilled in the art. For example, the specific combination and order of steps is just one possibility, as the present method may include a combination of steps that has fewer, greater, or different steps than that shown here. All such other embodiments, changes, and modifications are intended to come within the scope of the appended claims.

As used in this specification and claims, the terms "for example", "e.g.", "for instance", "such as", and "like" and the terms "comprising", "having", "including", and their other verb forms, when used in conjunction with a listing of one or more components or other items, are each to be construed as open-ended, meaning that the listing is not to be considered as excluding other additional components or items. Other terms are to be construed using their broadest reasonable meaning unless they are used in a context that requires a different interpretation.

What is claimed is:

1. A first wireless entity comprising: memory and a processor being configured to:
   a) transmit a first triangular beam comprising electromagnetic energy transmitted in a range of directions between a first angle and a second angle according to a first intensity distribution, wherein the first intensity distribution has a high intensity at the first angle and a low intensity, lower than the high intensity, at the second angle, and wherein the first intensity distribution varies linearly from the high intensity at the first angle to the low intensity at the second angle; and
   b) transmit a second triangular beam comprising electromagnetic energy transmitted in the range of directions between the first angle and the second angle according to a second intensity distribution, wherein the second intensity distribution has the low intensity at the first angle and the high intensity at the second angle, and wherein the second intensity distribution varies linearly from the low intensity at the first angle to the high intensity at the second angle.

2. The first wireless entity of claim 1, wherein the electromagnetic energy is first and second triangular beams are transmitted according to 5G technology.

3. The first wireless entity of claim 1, further configured to:
   a) receive, from a second wireless entity, a message comprising either:
      i) two signal measurements; or
      ii) a ratio of the two signal measurements;
   b) calculate an alignment angle based on:
      i) the first angle;
      ii) the second angle; and
      iii) the two signal measurements or the ratio thereof; and
   c) transmit a message to the second wireless entity specifying either:
      i) the alignment angle; or
      ii) 180 degrees plus the alignment angle.

4. The first wireless entity of claim 3, further comprising:
   a) determining a correction function comprising a difference between the first intensity distribution and a linear ramp; and
   b) adjusting the ratio or the two signal measurements according to the correction function.

5. The first wireless entity of claim 1, further configured to:
   a) transmit a planning message to a second wireless entity, the planning message specifying the first and second angles;
   b) receive, from the second wireless entity, a results message specifying an alignment angle comprising an angle between the first and second wireless entities, wherein the alignment angle is determined, by the second wireless entity, according to:
      i) the first and second angles; and
      ii) signal measurements made by the second wireless entity during the first and second triangular beams.

6. The first wireless entity of claim 1, further configured to:
   a) transmit a third triangular beam comprising electromagnetic energy transmitted in a range of directions between a third angle and a fourth angle according to a third intensity distribution, wherein the third intensity distribution has the high intensity at the third angle and the low intensity at the fourth angle, and wherein the third intensity distribution varies linearly from the high intensity at the third angle to the low intensity at the fourth angle; and
   b) transmit a fourth triangular beam comprising electromagnetic energy transmitted in the range of directions between the third angle and the fourth angle according to a fourth intensity distribution, wherein the fourth intensity distribution has the low intensity at the third angle and the high intensity at the fourth angle, and wherein the fourth intensity distribution varies linearly from the low intensity at the third angle to the high intensity at the fourth angle; wherein:
   c) the third angle is between the first angle and the second angle; and
   d) an angular difference between the third angle and the fourth angle equals an angular difference between the first angle and the second angle.

7. The first wireless entity of claim 6, wherein the third angle is substantially midway between the first and second angles, wherein substantially midway comprises a range of 40% to 60% of the angular difference between the first and second angles.

8. The first wireless entity of claim 1, further configured to:
   a) transmit a third triangular beam comprising electromagnetic energy transmitted in a range of directions between the second angle and a third angle according to a third intensity distribution, wherein the third intensity distribution has the high intensity at the second angle and the low intensity at the third angle, and wherein the third intensity distribution varies linearly from the high intensity at the second angle to the low intensity at the third angle; and
   b) transmit a fourth triangular beam comprising electromagnetic energy transmitted in the range of directions between the second angle and the third angle according to a fourth intensity distribution, wherein the fourth intensity distribution has the low intensity at the second angle and the high intensity at the third angle, and wherein the fourth intensity distribution varies linearly from the low intensity at the second angle to the high intensity at the third angle; wherein:
   c) an angular difference between the second angle and the third angle equals an angular difference between the first angle and the second angle;
   d) the first and second triangular beams are phase-modulated according to a first phase; and
   e) the third and fourth triangular beams are phase-modulated according to a second phase different from the first phase.

9. The first wireless entity of claim 1, wherein:
   a) the first triangular beam is transmitted in a first resource element of a resource grid, each resource element of the resource grid comprising one subcarrier in frequency and one symbol-time in time;
   b) the second triangular beam is transmitted in a second resource element of the resource grid; and
   c) the first resource element occupies a particular subcarrier, and the second resource element occupies the particular subcarrier.

10. The first wireless entity of claim 1, wherein:
   a) the first triangular beam is transmitted in a first resource element of a resource grid, each resource element of the resource grid comprising one subcarrier in frequency and one symbol-time in time;
   b) the second triangular beam is transmitted in a second resource element of the resource grid; and c) the first resource element occupies a particular symbol-time, and the second resource element occupies the particular symbol-time.

11. A method for a wireless receiver to determine an angle, the method comprising:
   a) preparing a first triangular reception beam comprising a first sensitivity distribution in a range of directions between a first angle and a second angle, wherein the first sensitivity distribution has a high value at the first angle and the first sensitivity distribution has a low value at the second angle, the low value being lower than the high value, and wherein the first sensitivity distribution varies linearly between the high value at the first angle and the low value at the second angle;
   b) receiving a first signal using the first triangular reception beam, and determining a first amplitude of the first signal;
   c) preparing a second triangular reception beam comprising a second sensitivity distribution in the range of directions between the first angle and the second angle, wherein the second sensitivity distribution has the low value at the first angle and the second sensitivity distribution has the high value at the second angle, and wherein the second sensitivity distribution varies linearly between the low value at the first angle and the high value at the second angle;
   d) receiving a second signal using the second triangular reception beam, and determining a second amplitude of the second signal; and
   e) determining an alignment angle according to the first and second amplitudes and the first and second angles.

12. The method of claim 11, wherein the first signal and the second signal are isotropically transmitted.

13. The method of claim 11, wherein the determining an alignment angle comprises dividing the first amplitude by the second amplitude, or dividing the second amplitude by the first amplitude.

14. The method of claim 11, further comprising:
   a) preparing a third triangular reception beam comprising a third sensitivity distribution in a range of directions between a third angle and a fourth angle, wherein the third sensitivity distribution has the high value at the third angle and the third sensitivity distribution has the low value at the fourth angle, and wherein the third sensitivity distribution varies linearly between the high value at the third angle and the low value at the fourth angle;
   b) receiving a third signal using the third triangular reception beam, and determining a third amplitude of the third signal;
   c) preparing a fourth triangular reception beam comprising a fourth sensitivity distribution in the range of directions between the third angle and the fourth angle, wherein the fourth sensitivity distribution has the low value at the third angle and the fourth sensitivity distribution has the high value at the fourth angle, and wherein the fourth sensitivity distribution varies linearly between the low value at the third angle and the high value at the fourth angle;
   d) receiving a fourth signal using the fourth triangular reception beam, and determining a fourth amplitude of the fourth signal; and
   e) determining the alignment angle according to either:
      i) the first and second amplitudes, and the first and second angles; or
      ii) the third and fourth amplitudes, and the third and fourth angles; or
      iii) a combination of these.

15. He method of claim 14, further comprising:
   a) calculating a first magnitude comprising a magnitude of a difference between the first amplitude and the second amplitude;
   b) calculating a second magnitude comprising a magnitude of a difference between the third amplitude and the fourth amplitude;
   c) if the first magnitude is smaller than the second magnitude, determining the alignment angle according to the first and second amplitudes and the first and second angles; and
   d) if the second magnitude is smaller than the first magnitude, determining the alignment angle according to the third and fourth amplitudes and the third and fourth angles.

16. Non-transitory computer-readable media in a base station of a wireless network, the media containing instructions that when implemented in a computing environment cause a method to be performed, the method comprising:
   a) determining that beam alignment is needed;
   b) configuring an antenna to emit electromagnetic radiation according to a first angular distribution comprising an intensity that increases linearly from a first angle to a second angle, and transmitting a first pulse according to the first angular distribution;
   c) configuring the antenna to emit electromagnetic radiation according to a second angular distribution comprising an intensity that increases linearly from the second angle to the first angle, and transmitting a second pulse according to the second angular distribution;
   d) receiving, from a user device of the wireless network, a data message specifying either a first measurement and a second measurement, or a ratio of the first and second measurements;
   e) determining, according to the first and second measurement, or the ratio, and according to the first and second angles, an alignment direction toward the user device; and
   f) transmitting an alignment message to the user device, specifying either an alignment angle representing the alignment direction, or the alignment angle plus 180 degrees.

17. The media of claim 16, the method further comprising configuring a plurality of antennas to emit electromagnetic radiation, wherein:
   a) each antenna of the plurality is aimed in a different direction;
   b) each antenna is configured to emit intensity according to an angular distribution comprising an intensity that increases or decreases linearly from a specified angle to another specified angle; and
   c) the plurality of antennas are further configured to emit, in combination, the electromagnetic radiation in all horizontal directions around the plurality of antennas.

18. The media of claim 16, further comprising:
   a) configuring the antenna to emit electromagnetic radiation according to a third angular distribution comprising an intensity that increases linearly from a third angle to a fourth angle, and transmitting a third pulse according to the third angular distribution; and
   b) configuring the antenna to emit electromagnetic radiation according to a fourth angular distribution comprising an intensity that increases linearly from the fourth angle to the third angle, and transmitting a fourth pulse according to the fourth angular distribution;

c) wherein the third angle is between a first sum and a second sum, the first sum comprising 0.4 times the first angle plus 0.6 times the second angle, and the second sum comprising 0.6 times the first angle plus 0.4 times the second angle.

19. The media of claim 16, wherein:
a) the determining that beam alignment is needed comprises at least one of:
   i) determining that a semi-persistently scheduled beam alignment time has arrived;
   ii) determining that a new user device has registered on the wireless network; and
   iii) determining that a mobile user device has requested assistance in determining an alignment direction of the user device.

20. The media of claim 16, further comprising:
a) transmitting at least two further pulses of electromagnetic radiation, wherein the further pulses of electromagnetic radiation are transmitted isotropically; and
b) receiving, from the user device, a further alignment message specifying a further alignment angle determined, by the user device, according to the at least two further pulses of electromagnetic radiation.

\* \* \* \* \*